(12) United States Patent
Federman et al.

(10) Patent No.: US 7,164,242 B2
(45) Date of Patent: Jan. 16, 2007

(54) VARIABLE SPEED DRIVE FOR MULTIPLE LOADS

(75) Inventors: Israel Federman, York, PA (US); Harold Robert Schnetzka, York, PA (US)

(73) Assignee: York International Corp., York, PA (US)

(*) Notice: Subject to any disclaimer, the term of this patent is extended or adjusted under 35 U.S.C. 154(b) by 0 days.

(21) Appl. No.: 10/788,994

(22) Filed: Feb. 27, 2004

(65) Prior Publication Data

US 2005/0189888 A1 Sep. 1, 2005

(51) Int. Cl.
*H02P 5/00* (2006.01)
*H02P 5/46* (2006.01)

(52) U.S. Cl. .............. 318/67; 318/254; 318/799; 318/801; 318/803; 318/138; 318/439; 363/34; 363/37; 363/67

(58) Field of Classification Search .......... 318/67, 318/439, 254, 700, 432, 799–811, 138
See application file for complete search history.

(56) References Cited

U.S. PATENT DOCUMENTS

| | | | |
|---|---|---|---|
| 2,442,021 A * | 5/1948 | Rose .......................... 318/45 |
| 3,390,320 A | 6/1968 | Kammiller et al. |
| 3,621,365 A | 11/1971 | Beck et al. |
| 3,909,687 A | 9/1975 | Abbondanti |
| 4,150,425 A | 4/1979 | Nagano et al. |
| 4,151,725 A | 5/1979 | Kountz et al. |
| 4,152,902 A * | 5/1979 | Lush ........................... 62/157 |
| 4,546,423 A | 10/1985 | Seki |
| 4,787,211 A | 11/1988 | Shaw |
| 4,877,388 A * | 10/1989 | Inaba et al. .................. 425/150 |
| 4,958,118 A | 9/1990 | Pottebaum |
| 5,010,287 A | 4/1991 | Mukai et al. |
| 5,130,617 A * | 7/1992 | Oshima et al. ............... 318/34 |
| 5,235,504 A * | 8/1993 | Sood .......................... 363/53 |

(Continued)

FOREIGN PATENT DOCUMENTS

DE 1004 7629 4/2002

(Continued)

OTHER PUBLICATIONS

Murphy, J.M.D., "Thyristor Control of A.C. Motors", Principles of Variable-Frequency A.C. Drives, Oct. 10, 1975, pp. 3-4, 111-114, & 120-121, Pergamon Press, New York.

*Primary Examiner*—Lincoln Donovan
*Assistant Examiner*—Tyrone Smith
(74) *Attorney, Agent, or Firm*—McNees Wallace & Nurick LLC

(57) ABSTRACT

A variable speed drive is provided having a converter to convert an AC voltage to a DC voltage, a DC link to filter and store energy from the converter, and a plurality of inverters, wherein each inverter is configured to convert a DC voltage to an AC voltage to power a corresponding load connected to the inverter The converter is electrically connected to an AC power source, the DC link is electrically connected to the converter, and the plurality of inverters are electrically connected in parallel to the DC link. Each inverter of the plurality of inverters is configured to operate substantially independently of other inverters of the plurality of inverters.

32 Claims, 5 Drawing Sheets

U.S. PATENT DOCUMENTS

| | | | |
|---|---|---|---|
| 5,237,494 A * | 8/1993 | Baader et al. ............... | 363/141 |
| 5,350,992 A | 9/1994 | Colter | |
| 5,446,645 A | 8/1995 | Shirahama et al. | |
| 5,488,279 A | 1/1996 | Kawamoto et al. | |
| 5,492,273 A | 2/1996 | Shah | |
| 5,503,248 A | 4/1996 | Peruggi et al. | |
| 5,509,504 A | 4/1996 | McHugh et al. | |
| 5,528,114 A * | 6/1996 | Tokizaki et al. ................ | 318/67 |
| 5,845,509 A | 12/1998 | Shaw et al. | |
| 5,894,736 A * | 4/1999 | Beaverson et al. ............ | 62/230 |
| 5,896,021 A * | 4/1999 | Kumar ........................ | 318/775 |
| 6,008,616 A | 12/1999 | Nagayama et al. | |
| 6,018,957 A | 2/2000 | Katra et al. | |
| 6,031,738 A | 2/2000 | Lipo et al. | |
| 6,075,717 A * | 6/2000 | Kumar et al. .................. | 363/87 |
| 6,124,697 A | 9/2000 | Wilkerson | |
| 6,185,946 B1 | 2/2001 | Hartman | |
| 6,229,722 B1 * | 5/2001 | Ichikawa et al. ............. | 363/71 |
| 6,325,142 B1 | 12/2001 | Bosley et al. | |
| 6,370,888 B1 | 4/2002 | Grabon | |
| 6,408,645 B1 | 6/2002 | Tsuboe et al. | |
| 6,434,960 B1 | 8/2002 | Rousseau | |
| 6,459,596 B1 | 10/2002 | Corzine | |
| 6,459,606 B1 | 10/2002 | Jadric | |
| 6,579,067 B1 | 6/2003 | Holden | |
| 2003/0041605 A1 | 3/2003 | Butcher et al. | |

FOREIGN PATENT DOCUMENTS

| | | |
|---|---|---|
| EP | 0 695 024 A2 | 1/1996 |
| EP | 1 022 844 A2 | 7/2000 |
| EP | 1 055 885 A2 | 11/2000 |
| EP | 1 271 067 A | 1/2003 |
| EP | 1 376 842 A1 | 1/2004 |
| GB | 1579045 | 11/1980 |
| JP | 60102878 | 6/1985 |
| WO | WO 95/06973 | 3/1995 |
| WO | WO 97/18420 | 5/1997 |

\* cited by examiner

VARIABLE SPEED DRIVE FOR MULTIPLE LOADS

BACKGROUND OF THE INVENTION

The present invention relates generally to variable speed drives. More specifically, the present invention relates to a variable speed drive that has multiple inverter outputs that can each power a corresponding load.

Many water chiller or refrigeration applications use multiple refrigeration circuits, i.e., two or more refrigeration circuits, each having one or more compressors dedicated to the refrigeration circuit. One purpose of the multiple or redundant refrigerant circuits and compressors is to provide improved reliability of the overall system by having one or more refrigerant circuits and compressors remain operational to provide a reduced level of cooling capacity in the event that a refrigerant circuit and/or compressor fails and can no longer provide cooling capacity.

The corresponding compressor motor for each compressor of a refrigeration circuit can be connected to the AC power grid at the system location. The connection of each compressor motor to the power grid permits the remaining refrigerant circuits and compressors to remain operational even if one refrigerant circuit and/or compressor has a failure. A drawback to connecting the compressor motors to the power grid is that all of the motors are provided only one input voltage and frequency, and thus, can generate only one output speed.

To operate a motor at more than one output speed, a variable speed drive can be inserted between the system power grid and the motor to provide the motor with power at a variable frequency and variable voltage. In the multiple circuit refrigeration system, variable speed operation of the motors can be obtained by providing a corresponding variable speed drive for each compressor motor or by connecting all of the compressor motors in parallel to the inverter output of a variable speed drive. One drawback of using a variable speed drive for each compressor is that the overall chiller system becomes more expensive because multiple drives with a given cumulative power rating are more expensive than a single drive of the same output power rating. One drawback to connecting the compressor motors in parallel to the single inverter output of the variable speed drive is that a fault or failure of one of the motors may disable the variable speed drive and thus prevent the other motors connected to the variable speed drive from operating the remaining compressors on the chiller system. This disabling of the other motors connected to the variable speed drive defeats the function of the redundant refrigerant circuits because all the refrigerant circuits are disabled as a result of the disabling of the motors and the variable speed drive.

Therefore, what is needed is a variable speed drive that can provide substantially independent power to multiple loads or motors in a multiple circuit refrigeration system.

SUMMARY OF THE INVENTION

One embodiment of the present invention is directed to a variable speed drive having a converter to convert an AC voltage to a DC voltage. The converter is electrically connectable to an AC power source. The variable speed drive also has a DC link to filter and store energy from the converter. The DC link is electrically connected to the converter. Finally, the variable speed drive has a plurality of inverters electrically connected in parallel with the DC link. Each inverter of the plurality of inverters is configured to convert a DC voltage to an AC voltage to power a corresponding load connected to the inverter. In addition, each inverter of the plurality of inverters is configured to operate substantially independently of other inverters of the plurality of inverters.

Another embodiment of the present invention is directed to a chiller system including a first refrigerant circuit, a second refrigerant circuit and a variable speed drive. The first refrigerant circuit has a first compressor driven by a first motor, a first condenser arrangement and a first evaporator arrangement connected in a closed refrigerant loop. The second refrigerant circuit has a second compressor driven by a second motor, a second condenser arrangement and a second evaporator arrangement connected in a closed refrigerant loop. The variable speed drive has a converter stage to convert an AC voltage to a DC voltage, a DC link stage to filter and store energy from the converter stage, and an inverter stage including a first inverter and a second inverter each electrically connected in parallel to the DC link stage. The converter stage is configured to be electrically connectable to an AC power source. The DC link stage is electrically connected to the converter stage. The first inverter is configured to convert a DC voltage to an AC voltage to power the first motor. The second inverter is configured to convert a DC voltage to an AC voltage to power the second motor. The first inverter is configured to operate substantially independently of the second inverter.

Still another embodiment of the present invention is directed to a variable speed drive for a chiller system having a plurality of compressors. The variable speed drive includes a converter section, a DC link section, and an inverter section. The converter section converts an AC voltage to a DC voltage and is configured to be electrically connectable to an AC power source. The DC link section filters and stores energy from the converter section and has a DC bus electrically connected to the converter section. The inverter section includes a plurality of inverters electrically connected in parallel to the DC link section. Each inverter of the plurality of inverters is configured to convert a DC voltage to an AC voltage to power a corresponding compressor motor, and each inverter of the plurality of inverters is configured to operate substantially independently of other inverters of the plurality of inverters.

One advantage of the present invention is that it can provide power to multiple loads.

Another advantage of the present invention is that it provides a high degree of reliability in a multiple refrigeration circuit system with minimal additional cost.

Still another advantage of the present invention is that it can maintain power to the remaining motors in a system in the event a fault occurs in one of the motors.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
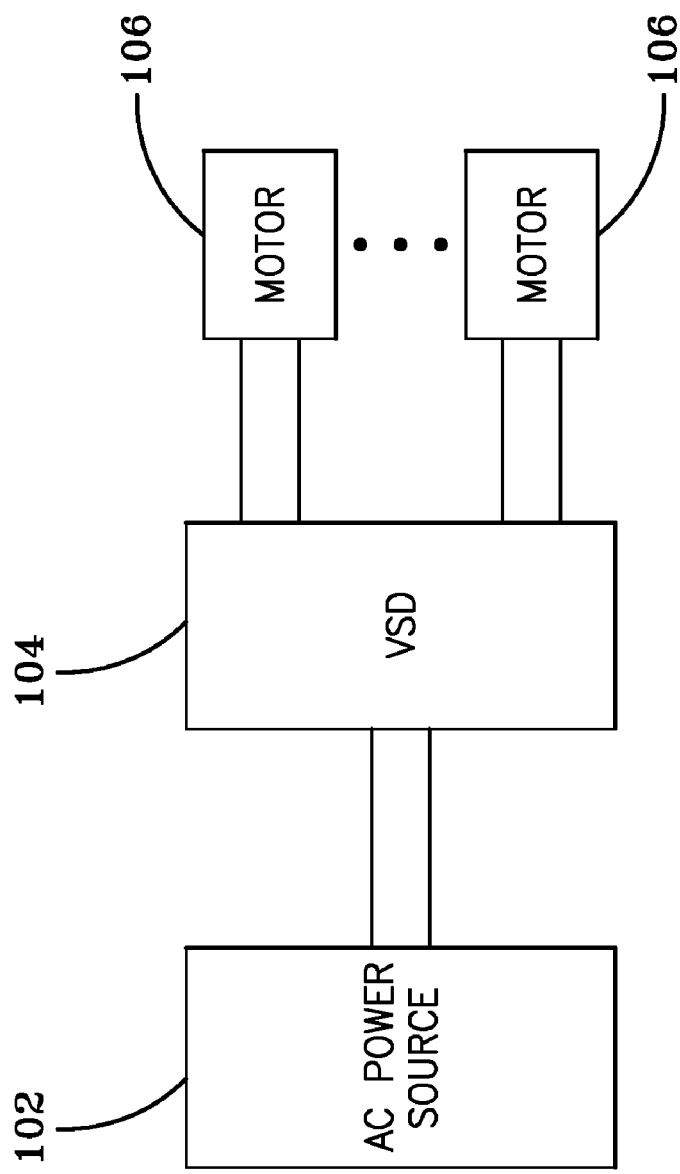
FIG. 1 illustrates a general application of the present invention.

FIG. 1 illustrates generally an application of the present invention. An AC power source 102 supplies a variable speed drive (VSD) 104, which powers a plurality of motors 106. The motors 106 are preferably used to drive corresponding compressors of a refrigeration or chiller system (see FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to each of the motors 106 at desired voltages and desired frequencies, both of which can be varied to satisfy particular requirements. Preferably, the VSD 104 can provide AC power to each of the motors 106 that may have higher voltages and frequencies and lower voltages and frequencies than the rated voltage and frequency of each motor 106. In another embodiment, the VSD 104 may again provide higher and lower frequencies but only the same or lower voltages than the rated voltage and frequency of each motor 106. The motors 106 are preferably induction motors, but can include any type of motors, that are capable of being operated at variable speeds. The induction motors can have any suitable pole arrangement including two poles, four poles or six poles.

Figure 2:
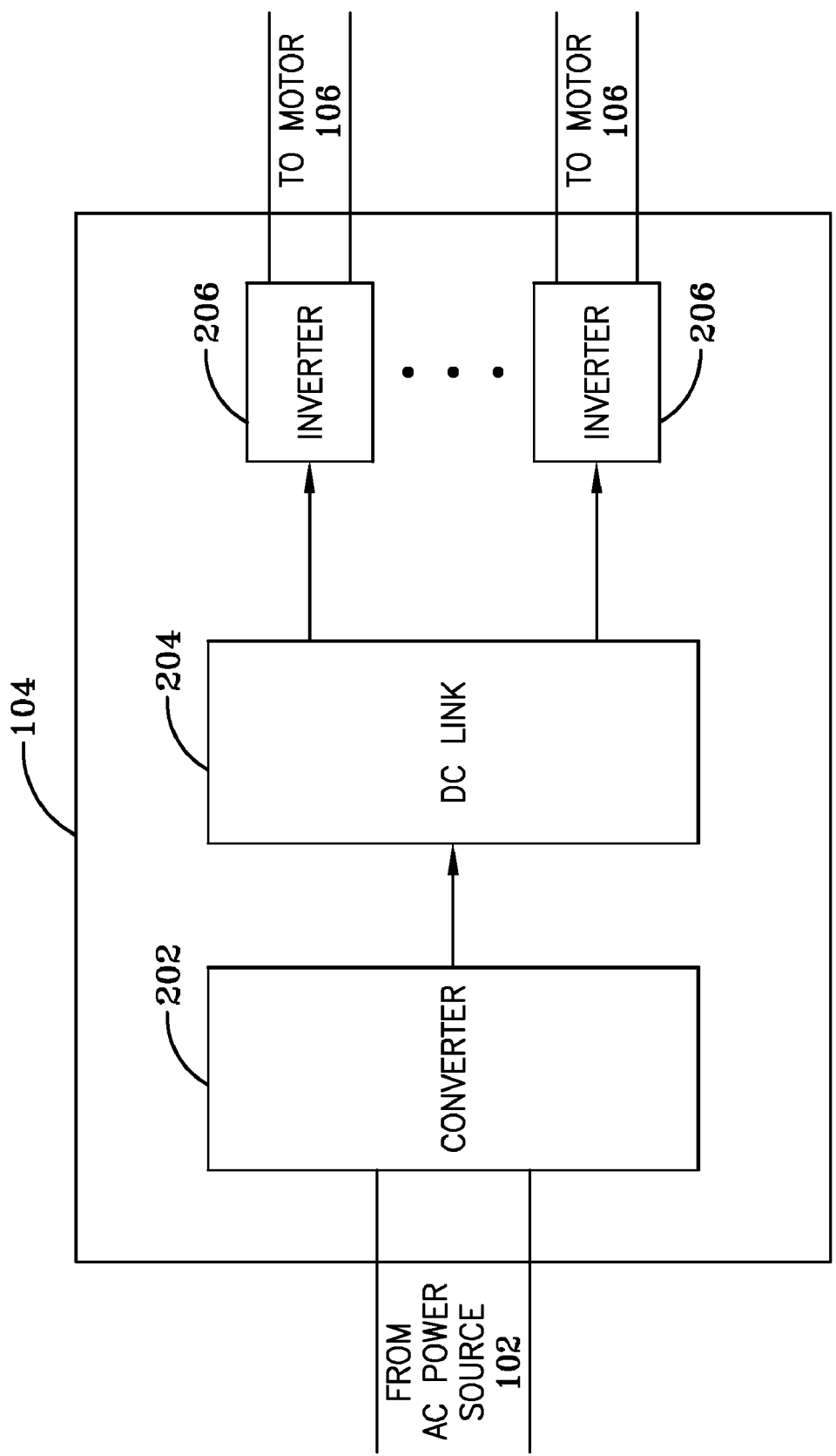
FIG. 2 illustrates schematically the variable speed drive of the present invention.

FIG. 2 illustrates schematically some of the components in one embodiment of the VSD 104. The VSD 104 can have three stages: a converter or rectifier stage 202, a DC link stage 204 and an output stage having a plurality of inverters 206. The converter 202 converts the fixed line frequency, fixed line voltage AC power from the AC power source 102 into DC power. The converter 202 can be in a rectifier arrangement composed of electronic switches that can only be turned on either by gating, when using silicon controlled rectifiers, or by being forward biased, when using diodes. Alternatively, the converter 202 can be in a converter arrangement composed of electronic switches that can be gated both on and off, to generate a controlled DC voltage and to shape the input current signal to appear sinusoidal, if so desired. The converter arrangement of converter 202 can have several different configurations including a boost conversion configuration (DC voltage varies from a value equal to the square root of two (2) times the RMS AC input voltage to a value greater than the square root of two (2) times the RMS AC input voltage), a buck conversion configuration (DC voltage varies from zero (0) to a value less than the square root of two (2) times the RMS AC input voltage), and a boost/buck configuration (DC voltage varies from zero (0) to a value that can be greater than or less than the square root of two (2) times the RMS AC input voltage). The converter arrangement of converter 202 has an additional level of flexibility over the rectifier arrangement, in that the AC power cannot only be rectified to DC power, but that the DC power level can also be controlled to a specific value. The DC link 204 filters the DC power from the converter 202 and provides energy storage components such as capacitors and/or inductors. Finally, the inverters 206 are connected in parallel on the DC link 204 and each inverter 206 converts the DC power from the DC link 204 into a variable frequency, variable voltage AC power for a corresponding motor 106.

In a preferred embodiment, the inverters 206 are jointly controlled by a control system such that each inverter 206 provides AC power at the same desired voltage and frequency to corresponding motors based on a common control signal or control instruction provided to the inverters 206. In another embodiment, the inverters 206 are individually controlled by a control system to permit each inverter 206 to provide AC power at different desired voltages and frequencies to corresponding motors 106 based on separate control signal or control instruction provided to each inverter 206. This capability permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by a control panel or other suitable control device.

For each motor 106 to be powered by the VSD 104, there is a corresponding inverter 206 in the output stage of the VSD 104. The number of motors 106 that can be powered by the VSD 104 is dependent upon the number of inverters 206 that are incorporated into the VSD 104. In a preferred embodiment, there can be either 2 or 3 inverters 206 incorporated in the VSD 104 that are connected in parallel to the DC link 204 and used for powering a corresponding motor 106. While it is preferred for the VSD 104 to have between 2 and 3 inverters 206, it is to be understood that more than 3 inverters 206 can be used so long as the DC link 204 can provide and maintain the appropriate DC voltage to each of the inverters 206.

In one embodiment of the present invention, the converter 202 can utilize diodes or silicon controlled rectifiers (SCRs) as the power switching mechanisms. The diodes and SCRs can provide the converter 202 with a large current surge capability and a low failure rate. In another embodiment, the converter 202 can utilize a diode or thyristor rectifier coupled to a boost DC/DC converter or a pulse width modulated boost rectifier to provide a boosted DC voltage to the DC link 204 in order to obtain an output voltage from the VSD 104 greater than the input voltage of the VSD 104. The DC link 204 can be composed of capacitors and inductors, which are passive devices that exhibit high reliability rates and very low failure rates. The inverters 206 are power modules that can include power transistors, integrated bipolar power transistor (IGBT) power switches and inverse diodes interconnected with wire bond technology. Furthermore, it is to be understood that the VSD 104 can incorporate different components from those discussed above and shown in FIG. 2 so long as the inverters 206 of the VSD 104 can provide the motors 106 with appropriate output voltages and frequencies.

The wire bond is a small diameter wire used to provide an electrical connection between terminals and/or silicon chips in the VSD 104, such as for providing a connection in parallel between the power device silicon chips such as the IGBTs and diodes in the inverter 206. The wire bonds inadvertently act similar to high-speed fuses and operate to disconnect the inverter 206 from the DC link 204 in the event a failure occurs in the inverter 206 or the motor 106. By disconnecting a damaged or failed inverter 206 from the DC link 204, the DC link 204 does not fail and can provide the appropriate DC voltage to the remaining inverters 206 to permit the remaining inverters 206 to operate normally.

Figure 4A:
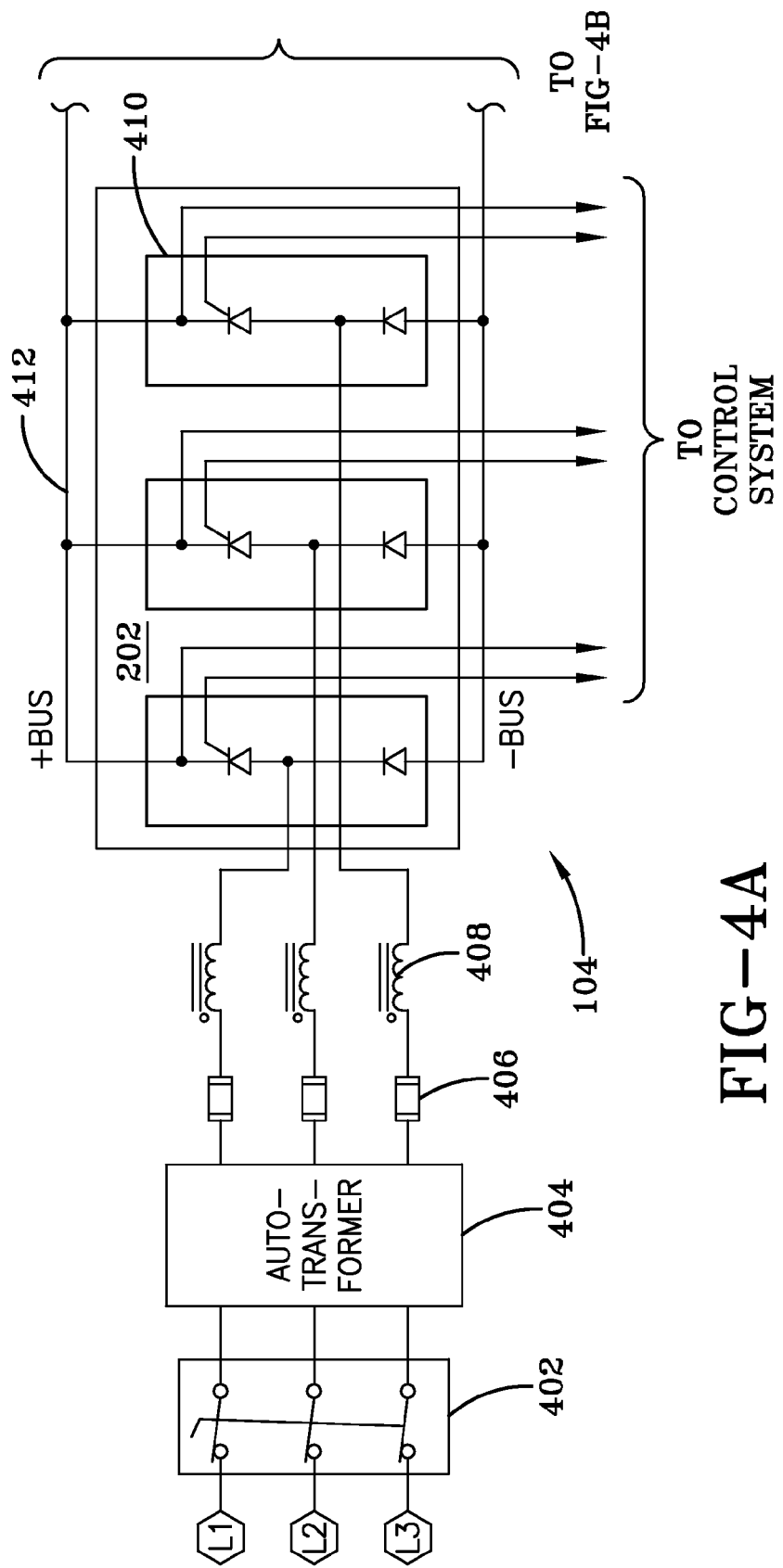
FIGS. 4A and 4B illustrate one embodiment of the variable speed drive of the present invention.
Figure 4B:
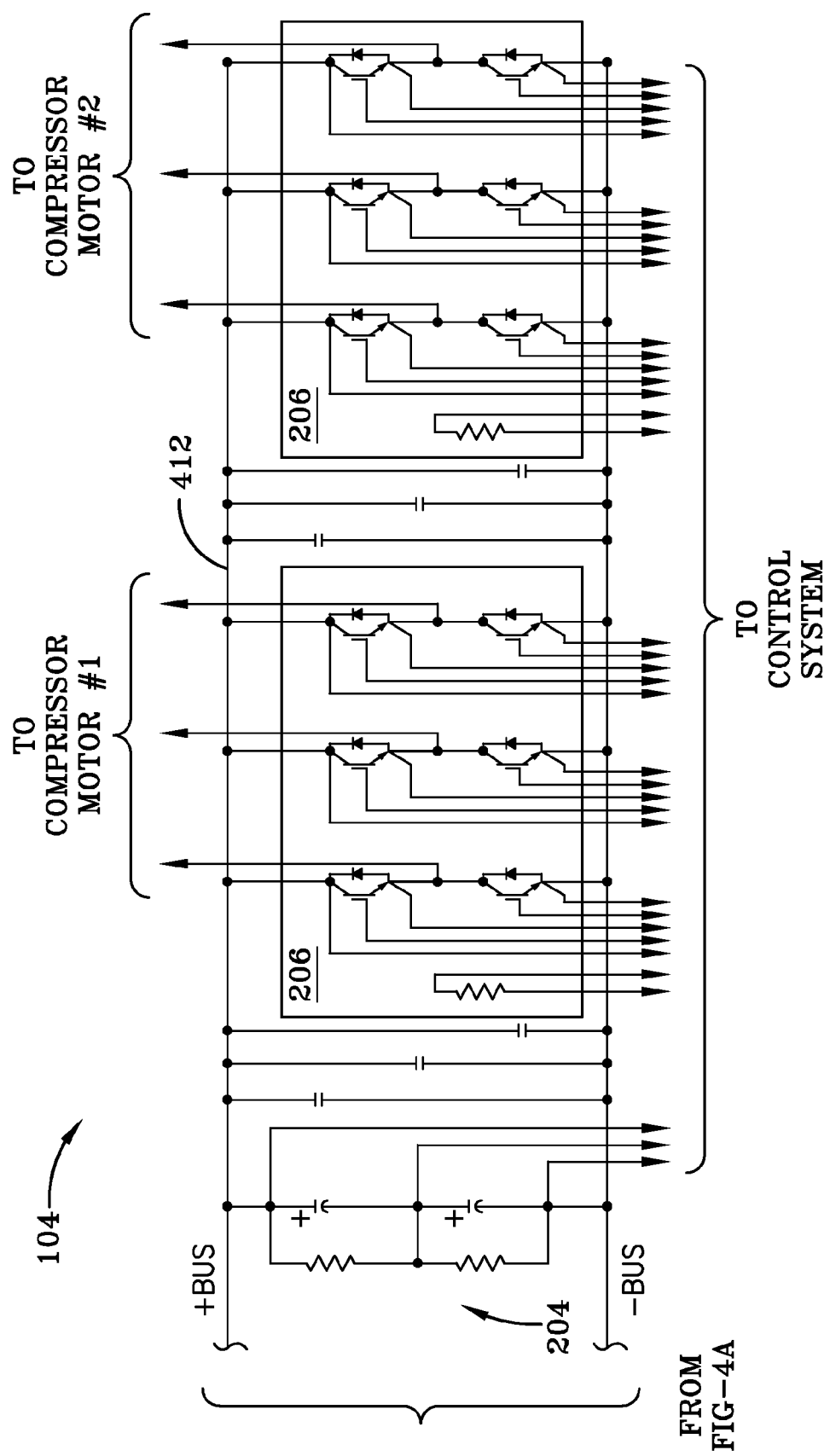

FIGS. 4A and 4B show a circuit diagram for one embodiment of the VSD 104. In this embodiment of the VSD 104, the input lines L1–L3 from the three-phase AC power source 102 are connected to a circuit breaker 402, which circuit breaker 402 can disconnect the VSD 104 from the AC power source 102 when an excess current, voltage or power is provided to the VSD 104. The circuit breaker 402 can then be connected to an optional autotransformer 404. The autotransformer 404, when used, is preferably used to adjust an input voltage (either up or down) from the AC power source 102 to a desired input voltage. Fuses 406 for each line can be used to disconnect that input phase or line of the VSD 104 in response to an excessive current in that line. Inductors 408 for each line are used to smooth the current in the corresponding line of the VSD. The output of each of the inductors 408 is then provided to a corresponding SCR 410 in the converter 202 to convert each phase of the input AC power to DC power. The converter 202 has a converter configuration using SCRs 410 and corresponding connections to a control system to control the switching of the SCRs 410. Each of the SCRs 410 has one output connected to a positive terminal or rail of a DC bus 412 and a second output connected to the negative terminal or rail of the DC bus 412.

Connected in parallel to the outputs of the SCRs 410 is the DC link 204. The DC link 204 in this embodiment includes capacitors and resistors to filter the DC power and store energy from the DC bus 412. Also connected to the DC bus 412 is two inverter sections 206, which convert the DC power on the DC bus 412 to three phase AC power for a compressor motor. In the embodiment shown in FIGS. 4A and 4B, two inverter sections or modules 206 are used. However, additional inverter modules 206 can be added and would have a similar circuit representation to the inverter modules 206 shown in FIG. 4B. The inverter modules 206 include three pairs (one for each output phase) of IGBT power switches and inverse diodes. The inverter modules 206 also include the corresponding control connections to control the switching of the IGBT power switches.

The VSD 104 can prevent large inrush currents from reaching the motors 106 during the startup of the motors 106. In addition, the inverters 206 of the VSD 104 can provide the AC power source 102 with power having about a unity power factor. Finally, the ability of the VSD 104 to adjust both the input voltage and input frequency received by the motor 106 permits a system equipped with VSD 104 to be operated on a variety of foreign and domestic power grids without having to alter the motors 106 for different power sources.

Figure 3:
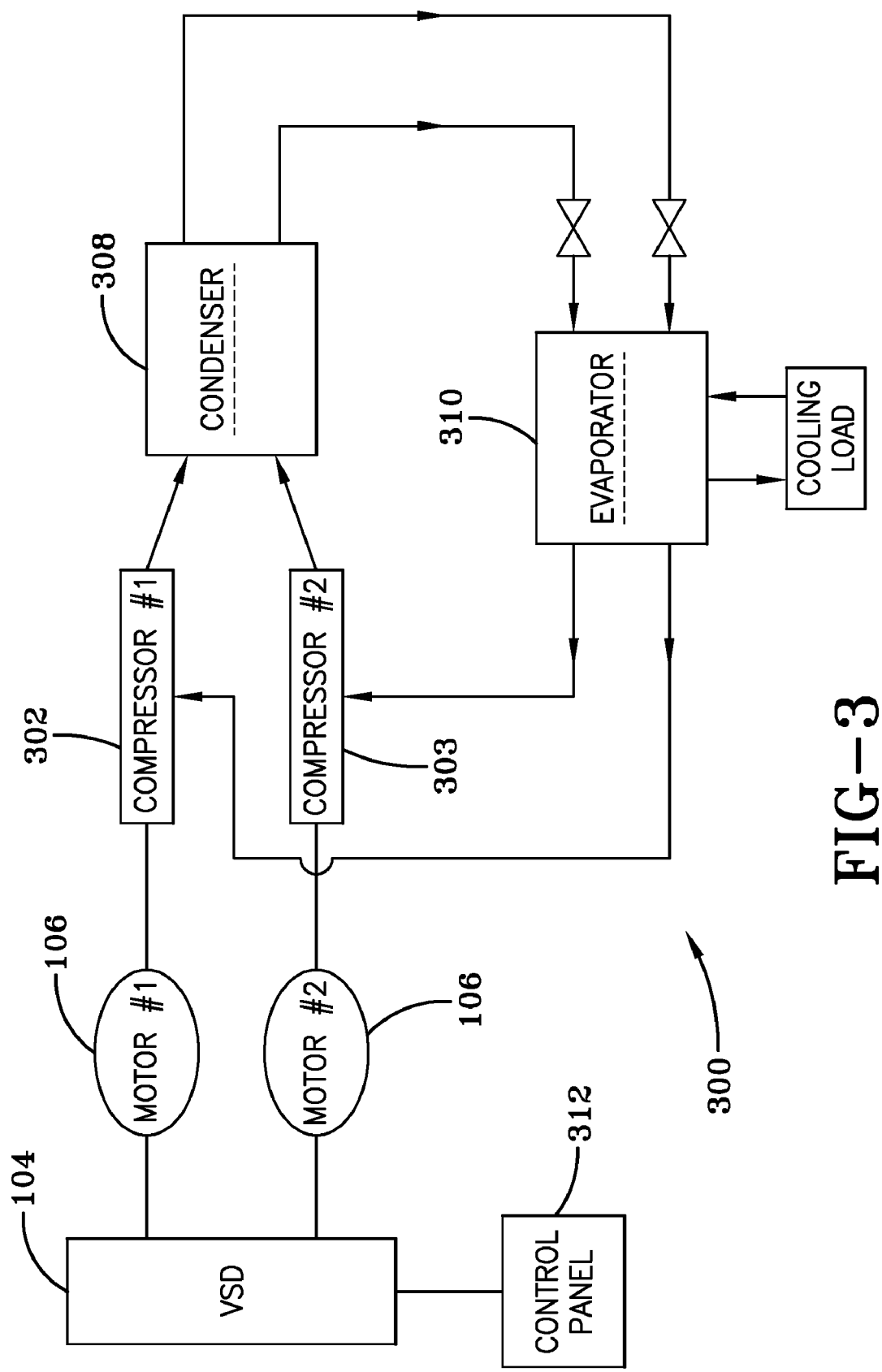
FIG. 3 illustrates an embodiment of the present invention used in a refrigeration or chiller system.

FIG. 3 illustrates generally one embodiment of the present invention incorporated in a refrigeration system. As shown, the HVAC, refrigeration or liquid chiller system 300 has two compressors incorporated in corresponding refrigerant circuits, but it is to be understood that the system 300 can have more than two refrigerant circuits for providing the desired system load and more than a single compressor for a corresponding refrigerant circuit. The system 300 includes a first compressor 302, a second compressor 303, a condenser arrangement 308, expansion devices, a water chiller or evaporator arrangement 310 and a control panel 312. The control panel 312 can include an analog to digital (A/D) converter, a microprocessor, a non-volatile memory, and an interface board to control operation of the refrigeration system 300. The control panel 312 can also be used to control the operation of the VSD 104, the motors 106 and the compressors 302 and 303. A conventional HVAC, refrigeration or liquid chiller system 300 includes many other features that are not shown in FIG. 3. These features have been purposely omitted to simplify the drawing for ease of illustration.

The compressors 302 and 303 compress a refrigerant vapor and deliver it to the condenser 308. The compressors 302 and 303 are preferably connected in separate refrigeration circuits, i.e., the refrigerant output by the compressors 302 and 303 are not mixed and travel in separate circuits through the system 300 before reentering the compressors 302 and 303 to begin another cycle. The separate refrigeration circuits preferably use a single condenser housing 308 and a single evaporator housing 310 for the corresponding heat exchanges. The condenser housing 308 and evaporator housing 310 maintain the separate refrigerant circuits either through a partition or other dividing means with the corresponding housing or with separate coil arrangements. In another embodiment of the present invention, the refrigerant output by the compressors 302 and 303 can be combined into a single refrigerant circuit to travel through the system 300 before being separated to reenter the compressors 302 and 303.

The compressors 302 and 303 are preferably screw compressors or centrifugal compressors, however the compressors can be any suitable type of compressor including reciprocating compressors, scroll compressors, rotary compressors or other type of compressor. The output capacity of the compressors 302 and 303 can be based on the operating speed of the compressors 302 and 303, which operating speed is dependent on the output speed of the motors 106 driven by the inverters 206 of the VSD 104. The refrigerant vapor delivered to the condenser 308 enters into a heat exchange relationship with a fluid, e.g., air or water, and undergoes a phase change to a refrigerant liquid as a result of the heat exchange relationship with the fluid. The condensed liquid refrigerant from condenser 308 flows through corresponding expansion devices to an evaporator 310.

The evaporator 310 can include connections for a supply line and a return line of a cooling load 130. A secondary liquid, which is preferably water, but can be any other suitable secondary liquid, e.g., ethylene, calcium chloride brine or sodium chloride brine, travels into the evaporator 310 via return line and exits the evaporator 310 via supply line. The liquid refrigerant in the evaporator 310 enters into a heat exchange relationship with the secondary liquid to chill the temperature of the secondary liquid. The refrigerant liquid in the evaporator 310 undergoes a phase change to a refrigerant vapor as a result of the heat exchange relationship with the secondary liquid. The vapor refrigerant in the evaporator 310 then returns to the compressors 302 and 303 to complete the cycle. It is to be understood that any suitable configuration of condenser 308 and evaporator 310 can be used in the system 300, provided that the appropriate phase change of the refrigerant in the condenser 304 and evaporator 306 is obtained.

Preferably, a control panel, microprocessor or controller can provide control signals to the VSD 104 to control the operation of the VSD 104, and particularly the operation of inverters 206, (and possibly motors 106) to provide the optimal operational setting for the VSD 104 and motors 106 depending on the particular sensor readings received by the control panel. For example, in the refrigeration system 300 of FIG. 3, the control panel 312 can adjust the output voltage and frequency from the inverters 206 to correspond to changing conditions in the refrigeration system 300, i.e., the control panel 312 can increase or decrease the output voltage and frequency of the inverters 206 of the VSD 104 in response to increasing or decreasing load conditions on the compressors 302 and 303 in order to obtain a desired operating speed of the motors 106 and a desired capacity of the compressors 302 and 303.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable speed drive comprising:
    a converter stage to convert an AC voltage to a DC voltage, the converter stage being configured to be electrically connectable to an AC power source;
    a DC link stage to filter and store energy from the converter stage, the DC link stage being electrically connected to the converter stage;
    an inverter stage comprising a plurality of inverters electrically connected in parallel to the DC link stage, each inverter of the plurality of inverters being configured to convert a DC voltage to an AC voltage to power a corresponding load, each inverter of the plurality of inverters being configured and disposed to receive an individual control signal from a control system that is separate and independent from control signals provided to other inverters of the plurality of inverters, and each inverter of the plurality of inverters being controlled and operated substantially independently of other inverters of the plurality of inverters by the individual control signals received from the control system; and
    wherein each inverter of the plurality of inverters comprises wire bonds sized to disconnect the inverter from the DC link stage in the event a fault occurs in one of the inverter or the corresponding load powered by the inverter.

2. The variable speed drive of claim 1 wherein the control system controls operation of the converter stage.

3. The variable speed drive of claim 1 wherein the control system controls the plurality of inverters as a group.

4. The variable speed drive of claim 3 wherein the control system provides a common set of control instructions to each inverter of the plurality of inverters to control operation of the plurality of inverters.

5. The variable speed drive of claim 1 wherein the control system individually controls each inverter of the plurality of inverters.

6. The variable speed drive of claim 5 wherein the control system provides a different set of control instructions to each inverter of the plurality of inverters to control operation of the corresponding inverter.

7. The variable speed drive of claim 1 wherein the converter stage is configured in a rectifier arrangement having electronic switches that are switchable only to an on position.

8. The variable speed drive of claim 1 wherein the converter stage is configured in a converter arrangement having electronic switches that are switchable to an on position and an off position.

9. The variable speed drive of claim 8 wherein the converter arrangement has a configuration selected from the group consisting of boost conversion, buck conversion and boost/buck conversion.

10. The variable speed drive of claim 1 wherein the plurality of inverters comprises one of two inverters or three inverters.

11. The variable speed drive of claim 1 wherein each inverter of the plurality of inverters is configured to provide a voltage and frequency to a corresponding load greater than a rated voltage and frequency of the corresponding load.

12. A chiller system comprising:
    a first refrigerant circuit, the first refrigerant circuit comprising a first compressor driven by a first motor, a first condenser arrangement and a first evaporator arrangement connected in a closed refrigerant loop;
    a second refrigerant circuit, the second refrigerant circuit comprising a second compressor driven by a second motor, a second condenser arrangement and a second evaporator arrangement connected in a closed refrigerant loop; and
    a variable speed drive comprising:
        a converter stage to convert an AC voltage to a DC voltage, the converter stage being configured to be electrically connectable to an AC power source;
        a DC link stage to filter and store energy from the converter stage, the DC link stage being electrically connected to the converter stage;
        an inverter stage comprising a first inverter and a second inverter each electrically connected in parallel to the DC link stage, the first inverter being configured to convert a DC voltage to an AC voltage to power the first motor, the second inverter being configured to convert a DC voltage to an AC voltage to power the second motor, the first inverter and the second inverter each being configured and disposed to receive an individual control signal from a control system that is separate and independent from control signals provided to the other inverter, and the first inverter and the second inverter each being controlled and operated substantially independently of each other by the individual control signals received from the control system; and
        wherein the first inverter and the second inverter each comprise wire bonds sized to disconnect the inverter from the DC link stage in the event a fault occurs in one of the inverter and the corresponding motor powered by the inverter.

13. The chiller system of claim 12 wherein the control system also controls operation of the converter stage.

14. The chiller system of claim 13 wherein the control system provides a common set of control instructions to the first inverter and the second inverter, wherein the first inverter and the second inverter provide AC power at a same frequency and voltage to the first motor and the second motor in response to the common set of control instructions.

15. The chiller system of claim 12 wherein the first condenser arrangement and the second condenser arrangement each comprise a portion of a combined condenser system.

16. The chiller system of claim 12 wherein the first evaporator arrangement and the second evaporator arrangement each comprise a portion of a combined evaporator system.

17. The chiller system of claim 12 wherein the first inverter and the second inverter are configured to provide a voltage and frequency to the first motor and the second motor greater than a rated voltage and frequency for the first motor and the second motor.

18. A variable speed drive for a chiller system having a plurality of compressors, the variable speed drive comprising:
a converter section to convert an AC voltage to a DC voltage, the converter section being configured to be electrically connectable to an AC power source;
a DC link section to filter and store energy from the converter section, the DC link section having a DC bus being electrically connected to the converter section;
an inverter section comprising a plurality of inverters electrically connected in parallel to the DC link section, each inverter of the plurality of inverters being configured to convert a DC voltage to an AC voltage to power a corresponding compressor motor, each inverter of the plurality of inverters being configured and disposed to receive an individual control signal from a control system that is separate and independent from control signals provided to other inverters of the plurality of inverters, and each inverter of the plurality of inverters being controlled and operated substantially independently of other inverters of the plurality of inverters by the individual control signals received from the control system; and
wherein each inverter of the plurality of inverters comprises wire bonds sized to disconnect the inverter from the DC link stage in the event a fault occurs in one of the inverter and the corresponding compressor motor.

19. The variable speed drive of claim 18 wherein the control system controls operation of the converter section.

20. The variable speed drive of claim 18 wherein the control system controls the plurality of inverters as a group.

21. The variable speed drive of claim 20 wherein the control system provides a common set of control instructions to each inverter of the plurality of inverters to control operation of the plurality of inverters.

22. The variable speed drive of claim 18 wherein the control system individually controls each inverter of the plurality of inverters.

23. The variable speed drive of claim 22 wherein the control system provides a different set of control instructions to each inverter of the plurality of inverters to control operation of the corresponding inverter.

24. The variable speed drive of claim 18 wherein the converter section comprises at least one silicon controlled rectifier.

25. The variable speed drive of claim 18 wherein the plurality of inverters comprises one of two inverters or three inverters.

26. The variable speed drive of claim 18 wherein each inverter of the plurality of inverters comprises at least one integrated bipolar transistor power switch and at least one inverse diode.

27. The variable speed drive of claim 18 wherein the DC link section comprises at least one capacitor.

28. The variable speed drive of claim 18 wherein:
the DC bus comprises a positive rail and a negative rail;
the converter section comprises at least one output connected to the positive rail of the DC bus and at least one output connected to the negative rail of the DC bus; and
each inverter of the plurality of inverters comprises at least one input connected to the positive rail of the DC bus and at least one input connected to the negative rail of the DC bus.

29. The variable speed drive of claim 18 further comprising a circuit breaker electrically connected in series between the AC power source and the converter section.

30. The variable speed drive of claim 18 further comprising an autotransformer electrically connected in series between the AC power source and the converter section to convert an AC voltage from the AC power source to a desired AC voltage.

31. The variable speed drive of claim 18 further comprising at least one fuse electrically connected in series between the AC power source and the converter section.

32. The variable speed drive of claim 18 further comprising at least one inductor electrically connected in series between the AC power source and the converter section.

* * * * *